United States Patent Office 3,515,001
Patented June 2, 1970

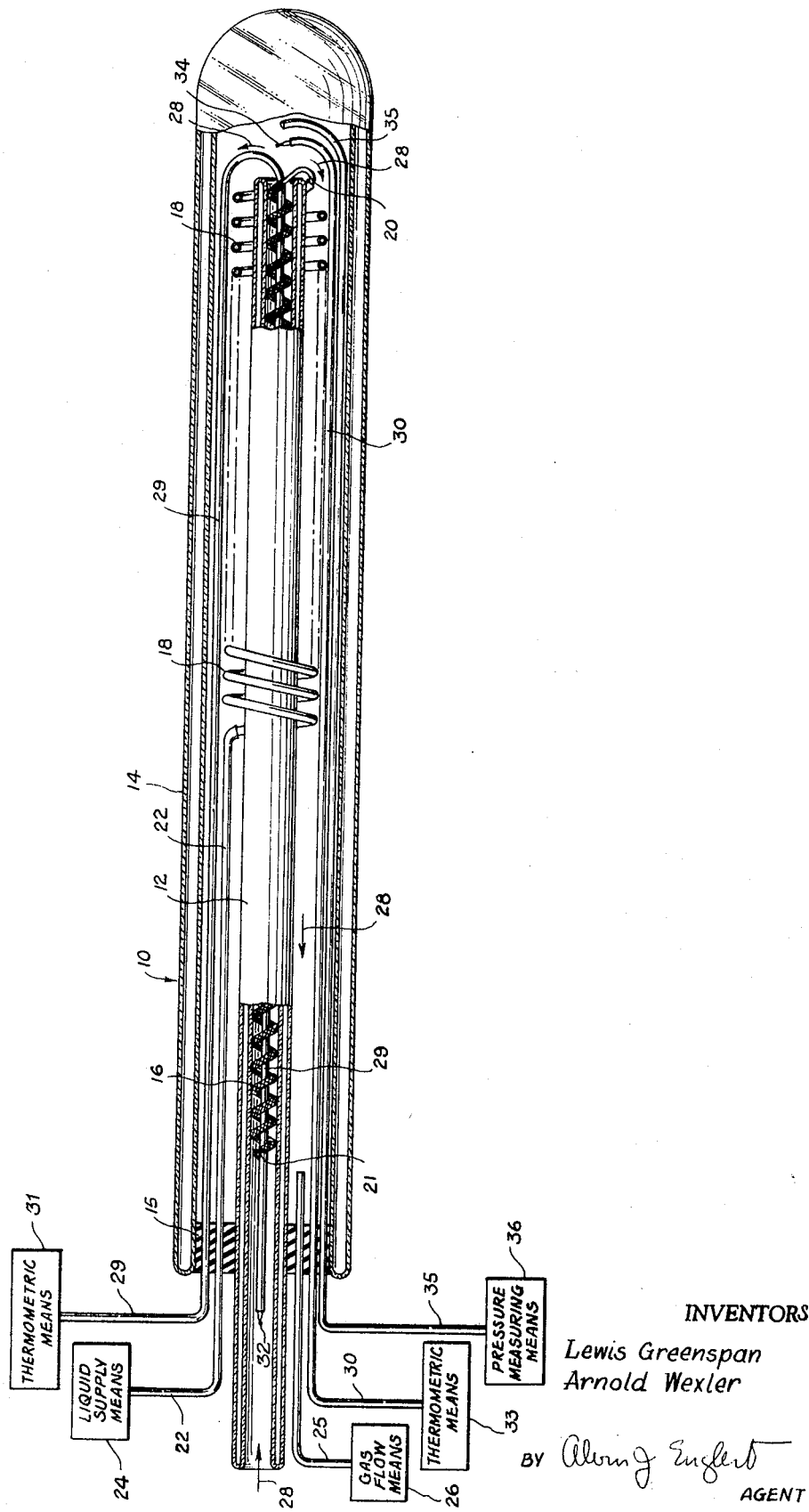

3,515,001
INSTRUMENT FOR MEASURING THE ADIABATIC SATURATION TEMPERATURE (THERMODYNAMIC WET-BULB TEMPERATURE) OF A VAPOR-GAS MIXTURE
Lewis Greenspan and Arnold Wexler, Rockville, Md., assignors to the United States of America as represented by the Secretary of Commerce
Filed Jan. 8, 1969, Ser. No. 789,782
Int. Cl. G01n 25/62
U.S. Cl. 73—338.6         7 Claims

ABSTRACT OF THE DISCLOSURE

A thermally insulated saturator tube is disposed in a thermally insulated enclosure. A wick is disposed in the saturator tube, and a heat exchanger is disposed about the saturator tube. A sample stream of a vapor-gas mixture is flowed serially over the wick and the heat exchanger. A stream of liquid corresponding to the condensed vapor of the vapor-gas mixture is counterflowed through the heat exchanger to the wick. The temperature of the sample stream is measured upstream and downstream of the wick, and the pressure of the sample stream flowing over the wick is measured.

BACKGROUND OF THE INVENTION

This invention relates to psychrometers, and more particularly to an instrument for measuring the "thermodynamic wet-bulb temperature" of a vapor-gas mixture.

The conventional psychrometer essentially comprises a dry-bulb thermometer and a wet-bulb thermometer exposed to the air whose humidity is to be measured. The thermometers and surrounding air form an open system undergoing a nonequilibrium process, which cannot be completely analyzed by thermodynamic theory (or by heat- and mass-transfer theory). Consequently, the dry- and wet-bulb temperature readings of the psychrometer must be converted to humidity values by means of empirical formulas, one of the most frequently used being the Ferrel formula. The resultant humidity values are acceptable in the routine measurement of humidity within narrow limits of humidity, temperature, and pressure; but are not acceptable beyond these limits, or in high precision work or in the measurement of the vapor content of other vapor-gas mixtures, such as toluene-air, carbon tetrachloride-nitrogen, or water-hydrogen (the formula yields very inaccurate values for the vapor content of these mixtures).

In order to avoid the use of the empirical formula, it has been suggested that the psychrometer be modified to embody a process which can be analyzed with thermodynamic theory. A psychrometer embodying such a process is the "adiabatic saturation psychrometer," based on the adiabatic saturation of a sample stream of gas with vapor. The "adiabatic saturation temperature" of the airstream is a "thermodynamic" wet-bulb temperature, having a precise thermodynamic relationship to the vapor content of the gas sample. In a known adiabatic saturation psychrometer, the sample stream of air is flowed through a thermally insulated tube containing a piece of natural sponge. The sponge is intermittently moistened with water, or is continuously moistened by means of a second sponge disposed in a second thermally insulated tube joined to the first tube by a T-joint. The second sponge is continuously supplied wtih water, which is precooled while flowing toward the first sponge by a second stream of air flowed through the second sponge. The water should be precooled to the wet-bulb temperature, so that the saturation of the sample stream of air with water will be an adiabatic process. In practice, it has been found that it is difficult to regulate the air and water flows in the instrument, and that it is impossible to achieve complete precooling of the water. Also, it has been found that the instrument does not work satisfactorily with any system other than water and air.

SUMMARY OF THE INVENTION

The present invention provides an adiabatic saturation psychrometer in which the liquid is readily and completely precooled to the wet-bulb temperature, and which can operate with any vapor-gas system. In brief, the invention includes a wick and a heat exchanger, each having a large surface area to volume ratio. The wick is mounted in a thermally insulated tube, and the heat exchanger is mounted around the tube. A sample stream of a vapor-gas mixture is flowed serially over the wick and heat exchanger, while liquid corresponding to the condensed vapor of the vapor-gas mixture is counterflowed through the heat exchanger to the wick. In this way, the mixture that has been saturated and hence cooled by flowing over the wick is used to precool the liquid being supplied to the wick. The counterflow in the heat exchanger enables the liquid to be cooled to very nearly wet-bulb temperature. The amount of liquid present in the heat exchanger and wick at any time is held to a minimum by the large surface area to volume ratios of the heat exchanger and wick, thereby providing a relatively fast instrument response time.

BRIEF DESCRIPTION OF THE DRAWING

The single figure of the drawing is an elevational view, partly sectioned, of an instrument constructed in accordance with this invention.

DETAILED DESCRIPTION OF THE INVENTION

The instrument 10 illustrated in the figure includes a thermally insulated saturator tube 12 which is mounted within a thermally insulated enclosure 14 by a seal 15 of any suitable configuration and material. A wick 16 is disposed in the saturator tube 12, and a heat exchanger 18 is disposed about the saturator tube 12, whereby the wick 16 and heat exchanger 18 are thermally insulated from each other by the saturator tube 12, and from the ambient by the enclosure 14. The saturator tube 12 and enclosure 14 are illustrated as comprising double-walled glass elements; the space between the walls is evacuated and sealed to provide a vacuum insulation, and in a preferred embodiment the inner walls of the double-walled elements are silvered to reduce heat transfer therethrough by radiation. In alternative embodiments, the saturator tube 12 and enclosure 14 may comprise evacuated, double-walled stainless steel elements, or single-walled foamed plastic (e.g., polystyrene) elements (not shown).

The wick 16 comprises a tube of woven material such as cotton, linen, or glass fibers, which is fitted over a spiral or helix of small-bore, inert plastic (e.g., polytetrafluoroethylene) tubing 20, the covered helix being snugly fitted within the saturator tube 12. The inner end of tubing 20 (the end adjacent the bottom of enclosure 14) is connected to the heat exchanger 18; the other end of the tubing 20 is open and the woven tube of wick 16 is tied or closed off immediately thereafter, as indicated at 21.

The heat exchanger 18 comprises a helix of small-bore tubing of an inert metal such as brass, stainless steel, or the like, loosely fitted over the saturator tube 12. A length of plastic tubing 22 is carried through the seal 15 to connect the heat exchanger 18 to a liquid supply means 24 comprising, for example, a liquid reservoir and a small liquid pump, for flowing a stream of liquid through the heat exchanger 18 and tubing 20 to the wick 16, so as to maintain the wick 16 moistened with the liquid. As mentioned above, the liquid in the liquid supply means 24 corresponds to the condensed vapor of the vapor-gas mixture whose thermodynamic wet-bulb temperature is to be determined.

A second length of inert plastic tubing 25 is carried through the seal 15 to connect a gas flow means 26 comprising, for example, a valve and vacuum pump, to the annular space between the saturator tube 12 and enclosure 14, so as to cause a sample stream 28 of the vapor-gas mixture to flow into the saturator tube 12, serially over the wick 16 and heat exchanger 18, and through the tubing 25 and gas flow means 26 to the atmosphere. Alternatively, the gas flow means could comprise a gas pump (not shown) connected to the inlet of the saturator tube 12, in which case the tubing 25 would be arranged to simply exhaust the instrument to the atmosphere.

The flow of the sample stream 28 serially over the wick 16 and heat exchanger 18 is counter to the flow of the liquid from the liquid supply means 24 through the heat exchanger 18 to the wick 16. The counterflow of the gas and liquid streams in the heat exchanger effects the maximum exchange of heat between the streams, whereby the sample stream 28, which has been cooled to wet-bulb temperature in flowing over the moistened wick 16, cools the liquid in the heat exchanger 18 to (or very nearly to) the wet-bulb temperature. In turn, the precooling of the liquid to the wet-bulb temperature causes the evaporation thereof, from the wick 16 into the sample stream 28, to proceed in a true adiabatic manner, thereby making the final temperature of the sample stream flowing over the wick a true "thermodynamic wet-bulb temperature."

A pair of thermometric means 31 and 33 comprising mercury-in-glass thermometers, or thermistors or thermocouples and their associated electrical circuitry, or the like, are fed at 29, 30 through the seal 15; and the sensitive portions 32 and 34, respectively, thereof are positioned on the axis of the saturator tube 12 upstream and downstream of the wick 16, in order to measure the dry-bulb and wet-bulb temperatures of the sample stream 28. The thermometric connecting means (glass stems or wires) 29, 30 preferably are brought in through the exiting sample stream as shown, so that they will be cooled by the exiting stream and thereby insure that adiabatic conditions will be maintained in the saturator tube 12.

A final length of inert plastic tubing 35 is fed through the seal 15, to connect a pressure measuring means 36 to the sample stream 28 flowing over the wick 16. The pressure measuring means may comprise, for example, an oil manometer for measuring the pressure of the sample stream relative to atmospheric pressure (the sample stream pressure will be above or below atmospheric pressure, depending on whether the sample stream is pressurized or aspirated through the instrument). The manometer reading is then converted to absolute pressure by adding thereto the atmospheric pressure, provided by a barometer (not shown).

The operation of the instrument 10 will be evident from the foregoing, and hence will only be summarized. The liquid reservoir in the liquid supply means 24 is filled with the appropriate liquid for the vapor-gas mixture to be tested: if the mixture is moist air, the liquid is water; if the mixture is toluene-air, the liquid is toluene; and so forth. The liquid supply means 24 and the gas flow means 26 are then activated, and adjusted to provide continuous flows of liquid and gas. The liquid is preferably flowed at an excess rate to insure that the wick 16 is always completely moistened; the excess liquid is carried by the sample stream toward the exit tubing 25, where it may be disposed of by a periodic draining, by trapping in a liquid trap if the instrument is aspirated, or by expulsion into the atmosphere or a catch basin if the sample stream is pressurized. The dry-bulb and wet-bulb temperature measuring means 31 and 33, respectively, and the pressure measuring means 36 are observed; and when it is determined that the instrument has attained the steady state, the temperatures and pressure are read (the pressure is converted to absolute pressure). The values so obtained are entered into the "adiabatic saturation equation," which depending on its form yields the initial mixing ratio of the vapor-gas mixture, or the partial pressure of the vapor component in the initial mixture. For a rigorous derivation and discussion of the adiabatic saturation equation, reference may be had to the article entitled "An Adiabatic Saturation Psychrometer" and published by the present applicants in the Journal of Research of the National Bureau of Standards, volume 72C, No. 1, pages 33–47, January–March 1968.

It is to be understood that the instrument shown in the figure is a preferred embodiment and that various modifications may be made without departing from the spirit and scope of the invention. For example, the wick 16 that is illustrated in the figure comprises a closed tube of woven material fitted over a length of helical plastic tubing 20; this arrangement is preferred because it provides a large evaporative surface area with a small amount of contained liquid and a small heat capacity, which provides a fast response to changes in the vapor content of the sample stream, and because it does not materially restrict the flow of the sample stream, which must not experience any pressure drop in flowing over the wick if the evaporation process is to be adiabatic. Nonetheless, the wick could comprise, for example, a plurality of closed tubes of woven material fitted over a respective plurality of parallel-fed lengths of tubing (not shown) disposed lengthwise in the saturator tube. Likewise, the heat exchanger 18 shown in the figure comprises a helical coil of metal tubing, which is a preferred arrangement because it again provides a large cooling surface with a small amount of contained liquid and a small heat capacity, and hence provides a fast instrument response time; but the helical pattern could be replaced with, say, a zig-zag annular pattern of tubing. Accordingly, it is intended that the invention be limited only by the claims appended hereto.

What is claimed is:

1. An instrument for measuring the adiabatic saturation temperature (thermodynamic wet-bulb temperature) of a vapor-gas mixture, comprising:
   a thermally insulated enclosure;
   a thermally insulated saturator tube disposed in said enclosure;
   a wick having a large surface area to volume ratio and low gas flow resistance disposed in said saturator tube;
   a heat exchanger having a large surface area to volume ratio disposed about said saturator tube;
   means for flowing a sample stream of said vapor-gas mixture serially over said wick and said heat exchanger;
   means for counterflowing liquid corresponding to the condensed vapor of said vapor-gas mixture through said heat exchanger to said wick;
   means for measuring the temperature of said sample stream upstream and downstream of said wick; and
   means for measuring the pressure of said sample stream flowing over said wick.

2. An instrument as set forth in claim 1, wherein said wick comprises a tube of woven material closed at one end, said tube of woven material being fitted over a feed tube connected to said heat exchanger.

3. An instrument as set forth in claim 2, wherein said feed tube comprises a helix of small-bore inert plastic tubing, said helix and said enclosing tube of woven material being fitted in said saturator tube.

4. An instrument as set forth in claim 1, wherein said heat exchanger comprises a helix of small-bore inert metal tubing loosely disposed about said saturator tube.

5. An instrument as set forth in claim 1, wherein said thermally insulated saturator tube comprises a double-walled, vacuum-insulated tube.

6. An instrument as set forth in claim 5, wherein at least one wall of said double-walled tube is highly reflective, to reduce heat transfer by radiation.

7. An instrument as set forth in claim 1, wherein said thermally insulated enclosure comprises a Dewar flask.

References Cited

UNITED STATES PATENTS 2,095,237  10/1937  Brooks _____ 73—338.6

S. CLEMENT SWISHER, Primary Examiner

D. F. CORR, Assistant Examiner